Dec. 8, 1942.  W. LÜTY  2,304,263
MANUFACTURE OF ADHESIVE FILMS
Filed Sept. 13, 1938
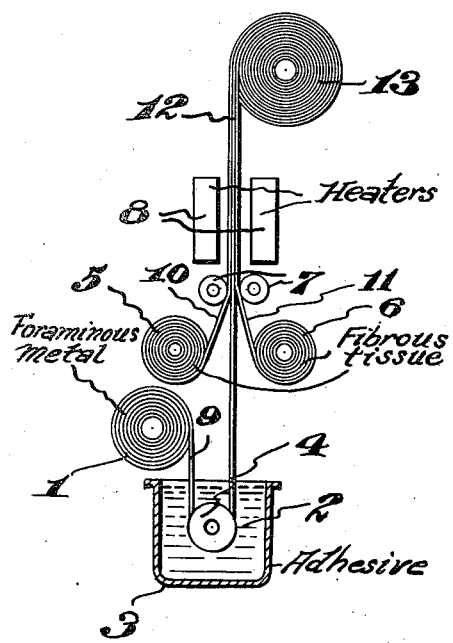
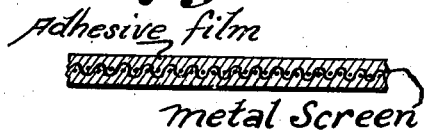
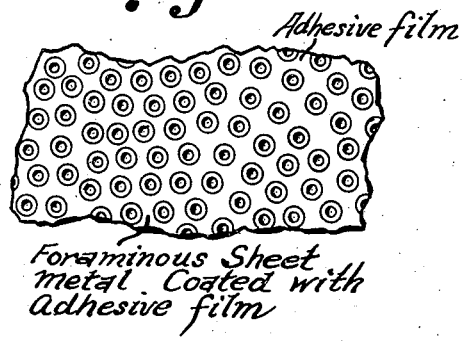
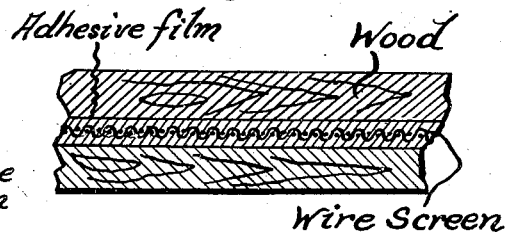
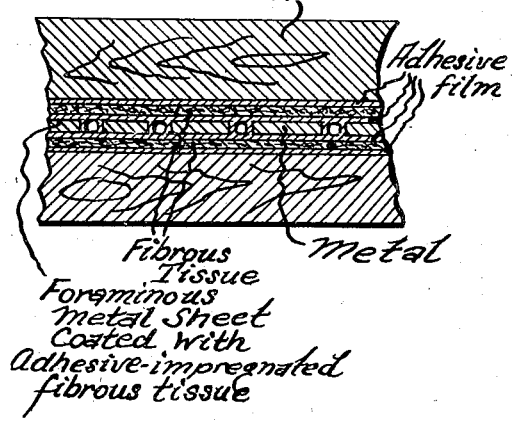
INVENTOR
Willy Lüty
BY Henry C. Parker
ATTORNEY Patented Dec. 8, 1942

2,304,263

UNITED STATES PATENT OFFICE 2,304,263

MANUFACTURE OF ADHESIVE FILMS

Willy Lüty, Essen-Bredeney, Germany, assignor, by mesne assignments, to The Licoro Corporation, New York, N. Y., a corporation of Delaware Application September 13, 1938, Serial No. 229,799
In Germany September 14, 1937

7 Claims. (Cl. 154—2)

This invention relates to manufacture of reinforced laminated products and adhesive films therefor; and it comprises a method of making reinforced adhesive films adapted to be used in the manufacture of laminated products such as ply-wood, for example, said process comprising coating a foraminous metal sheet or carrier with a heat-setting adhesive and then heating and drying said adhesive to a stage in which it is dry and hard but still reactive upon the application of heat and pressure, the said metal sheet being advantageously coated by passing it through a bath of a heat-setting artificial resin, such as a phenol-formaldehyde condensation product, for example, in its initial stage of condensation, the freshly coated metal sheet being covered, if desired, on one or both sides by means of a thin, porous, fibrous tissue readily penetrated by said artificial resin. The invention also includes a method of making reinforced laminated products in which the described reinforced adhesive film is inserted between laminations to be united and the assembly is combined by means of heat and pressure. In addition the invention includes the adhesive films and the laminated products produced by the said processes; all as more fully hereinafter set forth and as claimed.

Compound lumber, such as ply-wood, combined paper board and other laminated products are commonly made by pasting one or more of the laminations and then uniting them by means of heat and pressure. In a recent improvement of this method, which is described in the Weber et al. Patent No. 1,960,176, a sheeted adhesive is employed, this sheeted adhesive comprising a thin sheet of tissue paper which is impregnated with the alkaline condensation product of phenol and formaldehyde in its initial stage of condensation and then dried. This sheeted adhesive is placed between wood plies, for example, the resulting assembly being then subjected to heat and pressure. The condensation product liquefies under the action of the heat and forms a hard insoluble bond between the plies.

Laminated products which are manufactured in the manner described above are useful in many industrial applications. But for many special purposes additional strength is greatly desired. There is an important demand for laminated products having the finish of ply-wood, for example, but the strength of metal. The present invention provides such laminated products.

I have found that ply-wood, compound lumber, combined paper board and other like products can be readily provided with metallic reinforcement by the use of a sheeted adhesive which comprises a foraminous, thin metal sheet coated on both sides with a heat-setting adhesive. The adhesive employed may be any of the usual heat-setting adhesives which adhere to metal. For example the adhesive may be made from one of the natural or artificial fusible gums. But I have found that the initial condensation product of phenol and formaldehyde is particularly suitable for this purpose. This initial condensation product is advantageously made as described in the acknowledged patent to Weber et al. but satisfactory results are obtained by the use of the so-called Bakelite varnishes which are on the market and which are usually made by dissolving a phenol-formaldehyde resin, in various organic solvents.

The metal sheet employed may be of wire screening, wire gauze or perforated sheet metal. While various metals can be used, iron and steel are the cheapest. The metal sheet is coated on both sides, for example by dipping or spraying, with the heat setting resin. It is then dried to the point at which it is hard and non-tacky without being heated to setting temperatures. Heat is usually applied, however, to speed up the drying process by passing a strip through a coating bath of adhesive followed by drying. If desired sheets of thin tissue paper may be applied to the metal carrier after the coating operation. This prevents the adhesive from collecting in drops on the carrier and provides a better and more easily handled surface. After the drying operation the adhesive sheet is completed and ready to be applied in the manufacture of various laminated products.

My invention can be explained in greater detail by reference to the accompanying drawing which shows, more or less diagrammatically, apparatus elements which can be employed in my continuous method of manufacturing my sheeted adhesive, as well as showing various types of adhesive films and laminated products within the purview of this invention. In this showing Fig. 1 is an elevational view, partly in section, showing an assembly of apparatus elements which may be used in a continuous coating process within my invention, Fig. 2 is a sectional view on an enlarged scale of a sheeted adhesive made of wire screening, Fig. 3 is a plan view of a perforated metal sheet coated with adhesive, Fig. 4 is a sectional view on an enlarged scale through a piece of ply-wood within the present invention, this ply-wood being made with the adhesive film of Fig. 2, while Fig. 5 is a sectional view on an enlarged scale through another piece of ply-wood made of a foraminous metal sheet coated with adhesive and also coated on both sides with a fibrous tissue sheet.

Referring to Fig. 1 a roll of foraminous metal sheet is shown at 1. This metal sheet is continuously passed through the trough 3 which contains a bath of adhesive 2. The sheet passes around the roller 4 which may be supported in the trough. 5 and 6 are two rolls of thin, porous, tissue paper which may be applied on either or both sides of the coated metal by the doctor rolls 7. The coated sheet is then passed between drying units 8 and is finally rolled up on the roll 13. The heaters 8 are adapted to dry the adhesive. In the case of the use of a phenol-formaldehyde resin it is, of course, necessary to avoid heating the resin to setting temperatures. If desired the application of the fibrous tissue to the coated metal sheet can be omitted. These paper sheets are so thin and porous that they are readily penetrated by the adhesive and do not affect the strength of the bond produced. They are useful in producing a more uniform distribution of the adhesive and also in preventing the adhesive from checking and chipping off the metal.

It is evident that the adhesive, when applied in the manner described, penetrates the perforations in the metal sheet and forms a homogeneous, thin coating on both sides, thus producing a uniform, film-like, reinforced adhesive sheet. If desired the adhesive sheet can be cut by hand or by machinery after passing the heating units 8 instead of being rolled on the roll 13.

The laminated articles shown in Figs. 2 to 5 of the drawing are fully described by the use of appropriate legends. The adhesive sheet which is shown in Fig. 2 is made by coating a wire screen with adhesive, while that of Fig. 3 is made from a perforated sheet of metal. If the holes in the wire screen or in the metal sheet are sufficiently small, these may be closed by a dried film of adhesive which, of course, may be an advantage in that more adhesive is carried by the sheet. The quantity of adhesive carried by the metal, that is, the thickness of the adhesive coating on the metal can be varied readily by control of the temperature and viscosity of the adhesive in the bath. I have found that, for usual applications, only a very thin film of adhesive is required on the metal carrier or reinforcement. The optimum quantity of adhesive to be employed can be readily determined by test.

The ply-wood or other laminated products within the present invention are produced from the sheeted adhesives by the application of heat and pressure by methods well known in the art. Usually the layers of material to be united are assembled with sheets of adhesive alternating between layers. This assembly is then inserted in a press provided with heated platens. The press is closed and heat is applied for a short time at a temperature about 130° C. This produces softening of the resin to such an extent that it flows freely into all interstices and finally setting of the resin takes place. The finished product can then be removed from the press.

When the reinforced sheeted adhesives of the present invention are employed it is desirable to apply sufficient operating pressure to cause the ply-wood or other fibrous material which is being pressed to enter the perforations in the metal sheet, that is, the metal should become substantially embedded in the fibrous material. This produces an interlocking engagement between the metal and the fibrous material which contributes in an important manner to the strength of the finished article. By this means it is possible to produce reinforced ply-wood having a bond at least as strong as the wood itself. This is a new result in this art.

While I have described what I consider to be the best embodiments of my invention it is evident, of course, that various modifications can be made in the procedures which have been set out without departing from the purview of this invention. For example, I have found that it is advantageous, with certain types of adhesives which are not satisfactorily adherent to metal, to mix the adhesive with various inert filling materials, such as wood flour, powdered asbestos, pumice and the like. These fillers appreciably increase the adherence of the adhesive to the metal. If dsired the adhesive may be applied to the carrier in dry form, being sprinkled uniformly over the carrier, after which heat or heat and pressure may be applied to spread the adhesive and to cause it to adhere properly to the metal. The heat applied in this manner is, of course, merely sufficient to soften the adhesive without impairment of its heat setting properties. If desired the powdered adhesive may be mixed with fillers before being applied to the metal sheet. Other modifications of my process which fall within the scope of the following claims will be immediately evident to those skilled in this art.

What I claim is:

1. In the manufacture of reinforced sheeted adhesives, the process which comprises coating a foraminous metal sheet with a liquid phenol-formaldehyde condensation product capable of setting under the application of heat and pressure, the holes in said metal sheet being sufficiently small to be closed by a film of said condensation product during said coating procedure, whereby a continuous film of said product is formed covering the entire metal sheet, and hardening said film to a non-tacky state without impairing its heat setting porperties, thereby producing a reinforced sheeted adhesive which can be stored without becoming tacky and used for uniting sheets of ply-wood upon the application of heat and pressure with the production of a bond having substantially the strength of the wood itself.

2. In the manufacture of reinforced sheeted adhesives, the process which comprises coating a foraminous metal sheet with a liquid phenol-formaldehyde condensation product capable of setting under the application of heat and pressure, the holes of said sheet being too large to be closed by a film of said condensation product, applying a thin sheet of porous fibrous tissue on at least one side of said metal sheet while said condensation product is still liquid, said tissue sheet being capable of absorbing a film of said condensation product serving to cover said holes, whereby a continuous film of said condensation product is formed extending over the entire surface of the metal sheet, thereby producing a reinforced sheeted adhesive which can be stored without becoming tacky and used for uniting sheets of ply-wood upon the application of heat and pressure with the production of a bond having substantially the strength of the wood itself.

3. A reinforced sheeted adhesive adapted to be employed in the manufacture of compound lumber and other laminated articles, which comprises a foraminous metal carrier sheet, sufficiently strong to impart rigidifying characteristics to such a laminated article when incorporated therein, said metal sheet being uniformly coated with an artificial heat-setting resin and in combination with at least one thin sheet of porous fibrous tissue covering at least one face of said metal sheet and united therewith by said resin, said resin being in a hard non-tacky state but being capable of setting to form a permanent bond with wood and other fibrous material upon the application of heat and pressure; the said fibrous tissue sheet being saturated with said resin and serving to hold said resin in the apertures of said foraminous metal sheet, said apertures being too large to support a liquid film of said heat-setting resin in the absence of said fibrous tissue sheet.

4. The sheeted adhesive of claim 3 wherein said heat-setting resin is an alkaline condensation product of phenol and formaldehyde in its initial stage of condensation.

5. A reinforced sheeted adhesive adapted to be employed in the manufacture of compound lumber and other laminated articles, which comprises a foraminous metal carrier sheet of sufficient strength to impart rigidifying characteristics to such a laminated article when incorporated therein and perforated with apertures sufficiently small to hold and support a film of an artificial heat-setting resin when applied in liquid form to the surface of said metal sheet, said metal sheet being coated on both faces, including said apertures, with a continuous film of an artificial heat-setting resin, said resin being in a hard non-tacky state but being capable of setting to form a permanent bond with wood and other fibrous material upon the application of heat and pressure, sufficient resin being present in said film to produce a bond between the plies of said laminated article through the apertures of said metal carrier sheet as well as between said plies and said metal sheet.

6. In the manufacture of reinforced sheeted adhesives, the process which comprises applying to a foraminous metal sheet a powdered mixture of an artificial heat-setting resin and an inert filler capable of increasing the adherence of said resin to the metal, liquefying said resin by the application of heat, applying a thin sheet of porous fibrous tissue to said metal sheet and uniting said tissue with said metal sheet by means of said resin while said resin is sufficiently liquid to flow in a liquid film over said sheet and over the apertures therein, said apertures being too large to be closed by said liquid film in the absence of said tissue sheet, then hardening said film to a non-tacky state without impairing its heat-setting properties, thereby producing a reinforced sheeted adhesive which can be stored without becoming tacky and used for uniting sheets of compound lumber upon the application of heat and pressure with the production of a bond having substantially the strength of the wood itself, said metal sheet being sufficiently strong to impart rigidifying characteristics to said compound lumber.

7. The sheeted adhesive of claim 5 wherein said heat-setting resin is an alkaline condensation product of phenol and formaldehyde in its initial stage of condensation.

WILLY LÜTY.